United States Patent [19]

Hiroi et al.

[11] Patent Number: 4,965,629

[45] Date of Patent: Oct. 23, 1990

[54] SHEET FINISHER WITH A BINDER

[75] Inventors: Masakazu Hiroi, Yokohama; Masataka Naito, Kawasaki; Koichi Murakami, Yokohama, all of Japan

[73] Assignee: Canon Kabushiki Kaisha, Tokyo, Japan

[21] Appl. No.: 322,401

[22] Filed: Mar. 13, 1989

[30] Foreign Application Priority Data

Mar. 14, 1988 [JP] Japan .............................. 63-060063

[51] Int. Cl.[5] .................... G03B 27/48; G03B 27/50; G03G 21/00

[52] U.S. Cl. ...................................... 355/50; 270/53; 355/324

[58] Field of Search .................... 270/53; 355/324, 50, 355/51, 308

[56] References Cited

U.S. PATENT DOCUMENTS 4,313,670 2/1982 Caldwell ............................ 355/324

4,424,963 1/1984 Bartholet et al. ............... 355/324 X

FOREIGN PATENT DOCUMENTS 113474 5/1988 Japan .................................. 355/324

*Primary Examiner*—Richard A. Wintercorn

*Attorney, Agent, or Firm*—Fitzpatrick, Cella, Harper & Scinto

[57] ABSTRACT

A sheet finisher with a binder includes sheet stacker for stacking sheets discharged after images are formed thereon, a binder for binding the sheets stacked on the sheet stacker, a counter for counting a number of sheets accommodated in the sheet stacker, manual selector for starting binding operation of the binder, and a controller for discriminating whether or not the number counted by the counter is within a predetermined range, and for permitting operation of the binder by actuation of the manual selector, when the number is within the predetermined range.

8 Claims, 6 Drawing Sheets

SHEET FINISHER WITH A BINDER

FIELD OF THE INVENTION AND RELATED ART

The present invention relates to a sheet finisher usable with an image forming apparatus such as a copying machine, a printer and a laser beam printer, more particularly to a sheet finisher for sorting and/or aligning and stapling the sheets discharged out of the image forming apparatus.

A sheet finisher, which will hereinafter be called also "sorter", for sorting, aligning and stapling the sheets discharged from an image forming apparatus (copying machine). In such a sorter, when a copying operation for a last original supplied to the copying machine by an automatic document feeder attached to the copying machine is completed or when a predetermined number of originals are copied, the copying machine supplies a copy completion signal to the sorter, in response to which the sorter aligns the sheets sorted and accommodated in the bins and staple them, if staple instructions are inputted beforehand.

In such a sorter, however, when a book original is copied, and the copy sheets are sorted and accommodated in the bins, the apparatus does not know the completion of the copying operation for the desired number of originals, and therefore, no copy completion signal is supplied from the copying machine with the result that the stapling operation can not be started.

In addition, in such a sorter, it is required that whether the copies are to be stapled or not has to be inputted in the operation panel beforehand. If the operator fails to input the instructions, no stapling operation is performed.

SUMMARY OF THE INVENTION

Accordingly, it is a principal object of the present invention to provide a sheet finisher by which even when the number of copies to be reproduced is not known as when a book original is to be copied, the sheets can be bound assuredly.

According to an aspect of the present invention, there is provided a sheet finisher including counting means for counting a number of sheets to be bound, operating means for starting a binding operation, control means for discriminating whether or not the number of sheets counted by the counting means is within a predetermined range, and for permitting the operating means to start the binding operation, if the count is within the predetermined range.

According to this, the operating means makes it possible to bind the sheets, even if the sheets are the copies of a book original. In addition, the binding operation is allowed when the number of sheets counted by the counting means is within a predetermined range, and therefore, if the number counted is over the predetermined range, the binding operation is prohibited, thus preventing erroneous operation.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
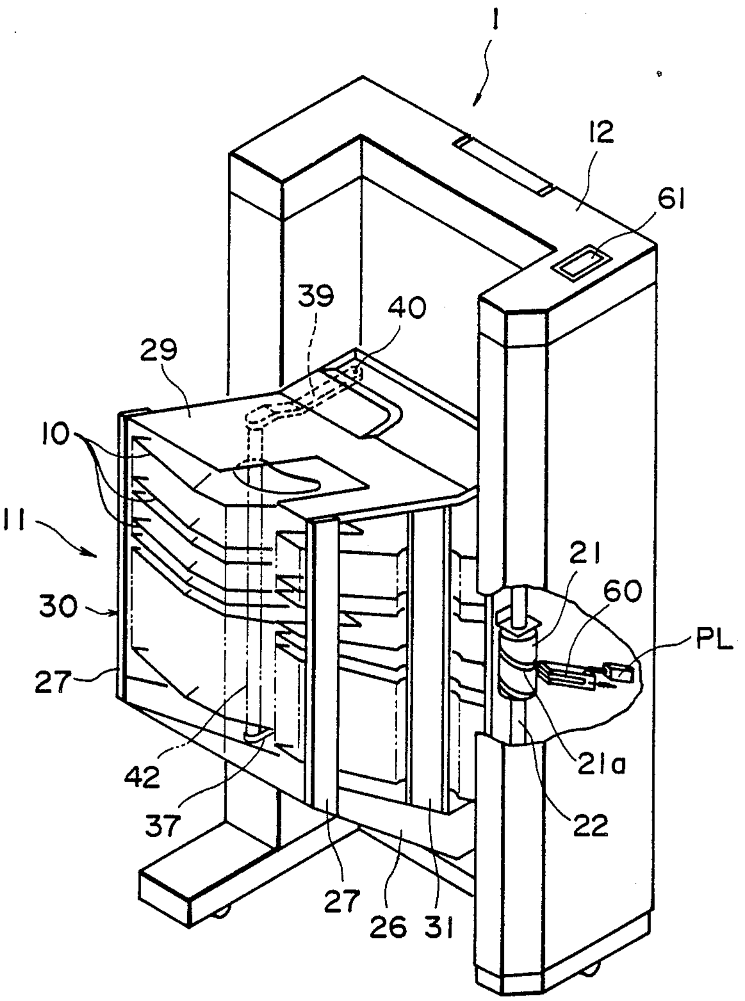
FIG. 1 is a perspective view of a sheet finisher according to an embodiment of the present invention.
Figure 2:
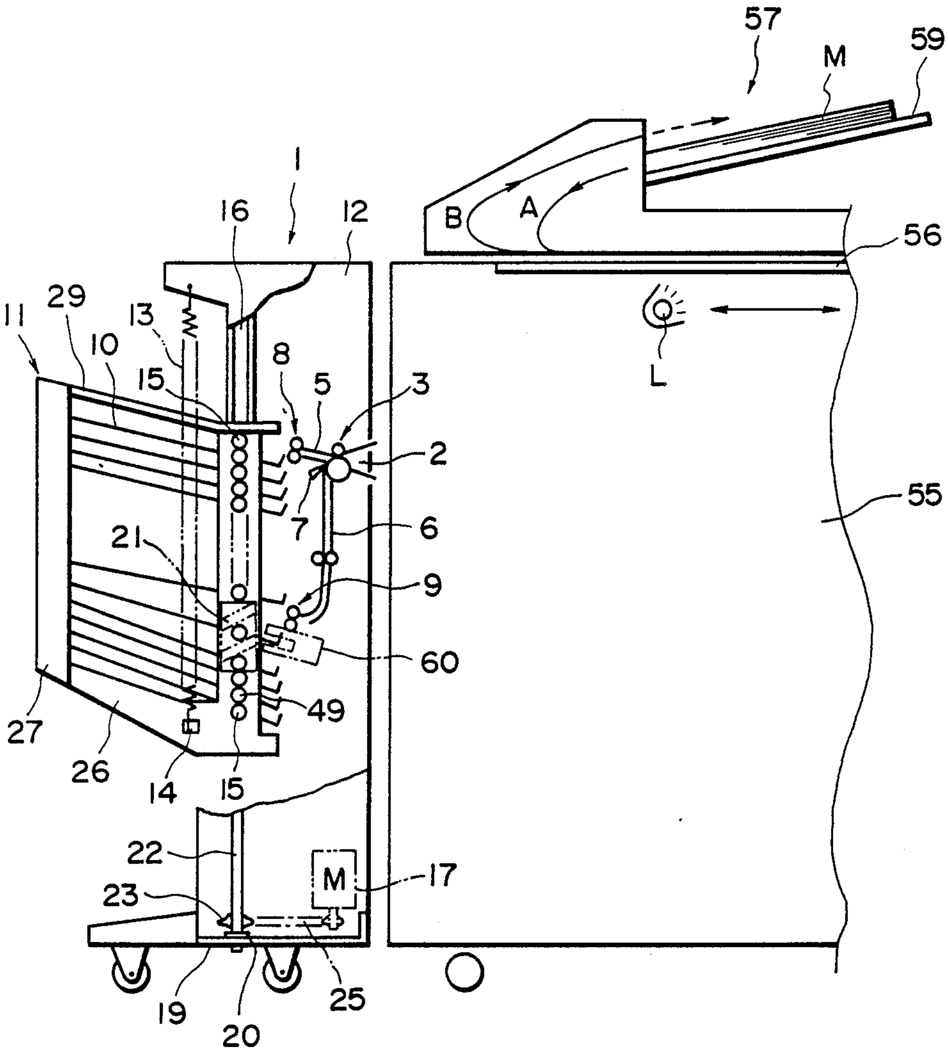
FIG. 2 is a front sectional view of the sheet finisher which is attached to an image forming apparatus.

Referring to FIG. 1, there is shown a sorter as an exemplary sheet finisher according to an embodiment of the present invention. FIG. 2 shows the sorter 1 attached to the copying machine 55.

The sorter 1 functions to receive, sort and accommodate sheets discharged from the copying machine 55. The copying machine 55 is equipped with a platen 56 for supporting an original M, and is equipped with an automatic document feeder 57 for feeding originals M to the platen 56. The automatic document feeder 57 includes an original supporting tray 59 for supporting originals M, a conveyance passage A for conveying the originals M from the tray 59 to the platen 56 and a discharge passage B for discharging the originals M from the platen 56 to the original tray 59.

As shown in FIGS. 1 and 2, the sorter 1 includes a main assembly 12 and a bin unit 11, and the main assembly 12 is provided with a pair of inlet rollers 3 adjacent to a sheet inlet 2. Downstream of the pair of rollers 3, there is a flapper 7 for directing the sheets selectively to a conveyance passage 5 or a conveyance passage 6. The conveyance passage 5 extends substantially horizontally to the downstream discharging roller pair 8. The other passage 6 extends downwardly to a downstream pair of discharging rollers 9. Adjacent to the pair of rollers 9, a stapler 60 is disposed.

Figure 3:
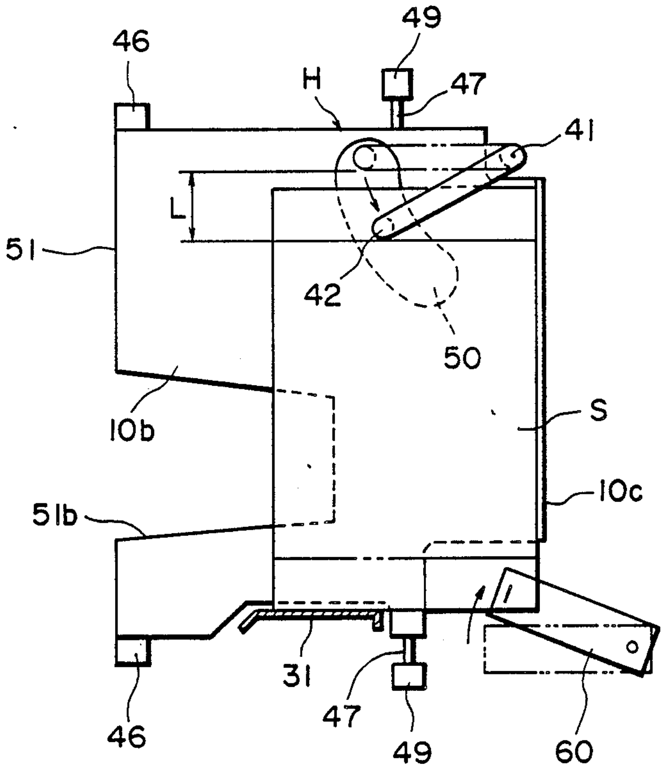
FIG. 3 is a top plan view of a bin used with the sheet finisher.

Referring to FIG. 3, the stapler 60 is normally situated at the position indicated by chain lines, and is shifted to an operative position indicated by solid lines by operation of a plunger PL in response to a stapling signal.

Downstream of the pairs 8 and 9 of discharging rollers, there is a bin unit 11 containing a number of bins. The bin unit is substantially vertically movably supported by a spring 13 having an end fixed to the main assembly 12 being engaged with a hook 14. The weight of the bin unit 11 is supported by the spring 13. At the sheet inlet side of the bin unit 11 and at an upper and lower positions thereof, guiding rollers 15 and 15 are rotatably supported and are engaged in a guiding groove 16 formed in the main assembly 12, extending substantially vertically. The rollers 15 and 15 roll in the groove 16 to guide the bin unit 11. The main assembly 12 has a driving motor 17, and the bottom plate 19 has a thrust bearing 20. The thrust bearing 20 is effective to bear the thrust load of a rotational shaft 22 at the bottom end thereof. The top end of the shaft 22 is rotatably supported by an unshown bearing. The shaft 22 has a lead cam 21 and a sprocket 23. Between the sprocket 23 and the shaft of the motor 17, a chain 25 is stretched, by which the rotation of the motor is transmitted to the shaft 22 by the chain 25.

The bin unit 11 includes a unit main assembly 30 including a bottom frame 26 having an inclined and horizontal portions, frames 27 and 27 rising vertically from the frame 26 at the front and rear side and a cover 29 supported by the frames 27 and 27. At the front side of the unit main assembly 30, there is an alignment reference plate 21 for abutment with the sheets. At the inlet and rear side of the frame 26, a lower arm 37 is rotatably supported, which is rotated by an unshown driving means. At a position of the cover 29 opposed to the arm 37, an arm 39 is fixed to a pin 40 rotatably supported on the cover 29. The rotational center of the arm 39 and the rotational center of the arm 37 are connected by a shaft 41 An end of the arm 37 and an end of the arm 39 are connected by an aligning rod 42, so that the aligning rod 42 is rotated by the driving means.

A stapling button 61 is disposed at the top of the main assembly 12 to start the stapling operation by the stapler 60. The button 61 contains therein an LED element 62 for displaying that the button 61 is actuatable (FIG. 5).

Figure 4:
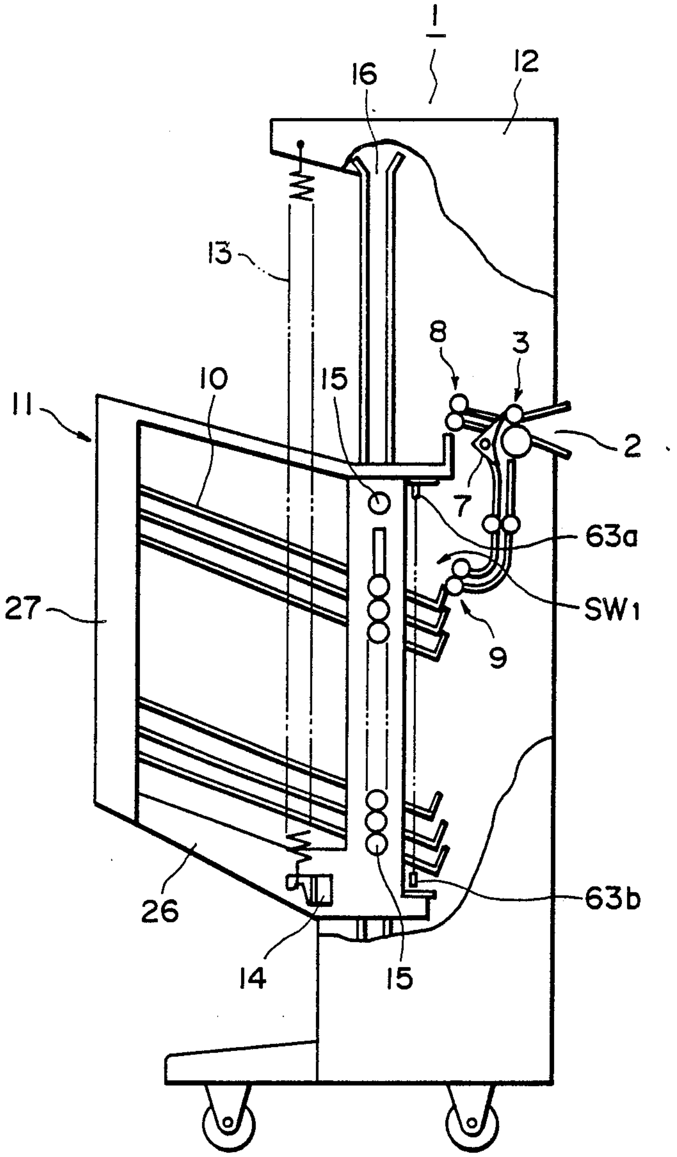
FIG. 4 is a front sectional view illustrating operation of the apparatus according to the embodiment of the present invention.
Figure 5:
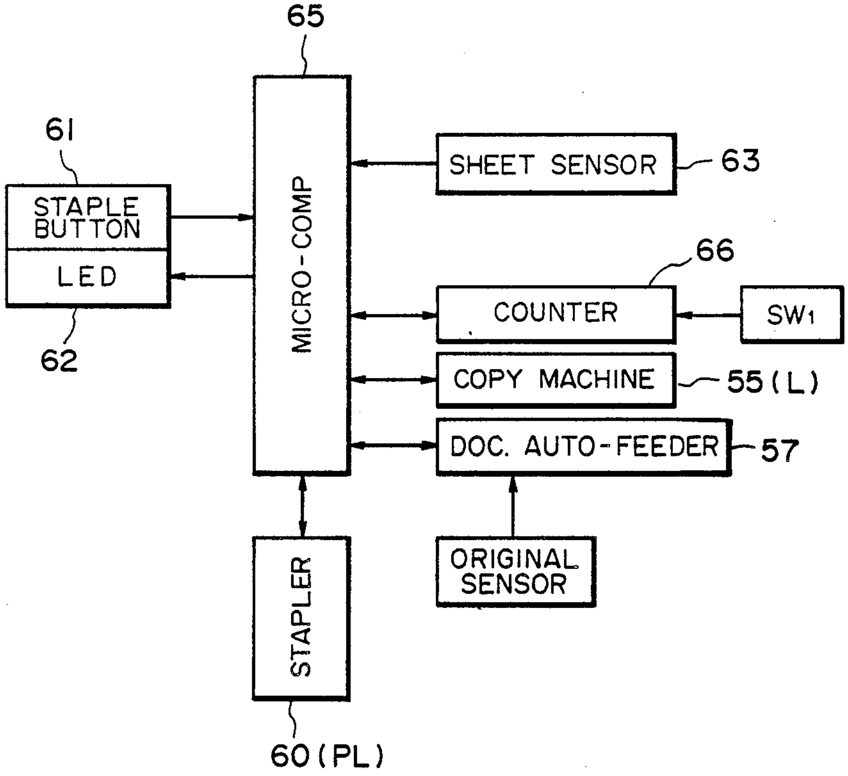
FIG. 5 is a block diagram illustrating the control means used with the sheet finisher according to the embodiment of the present invention.

As shown in FIGS. 4 and 5, the bin unit 11 is provided with a sheet detecting sensor 63 including a light emitting portion 63*a* and a light receiving portion 63*b* to detect the presence and absence of the sheets in the bins 10.

Referring back to FIG. 3, the bin is provided with engaging plates 46 at its front and rear sides adjacent the inlet end thereof. The engaging plate 46 is engaged with a supporting plate (not shown) provided at the inside of the frame 27, by which the bin 10 is supported at its inlet side. To the front and rear side of the bin 10 is provided with supporting pins 47 fixed thereto adjacent its inlet end. A roller 49 (cam follower or trunnion) is rotatably supported on the supporting pin 47. The bin 10 has an elongated slot 50 extending equidistantly from the shaft 41. The length of the slot 50 is longer than the rotational distance of the alignment rod 42, and the width thereof is sufficiently larger than that of the alignment rod 42. The inlet side of the bin 10*c* rise substantially vertically from the sheet accommodating surface 10*b*. The bin 10 is inclined at a predetermined angle with its inlet side upward relative to the main assembly. The inclination is effective to align the sheets in the direction of the sheet conveyance by the sheet sliding on the sheet accommodating surface 10*b* by its own weight until its trailing edge abuts the rising portion 10*c* of the bin. A cut-away portion 51*b* is formed in the bin body 51, extending from an edge thereof substantially into the center of the sheet accommodating surface 10*b* to facilitate removal of a small size sheets from the sheet accommodating surface 10*b*.

The alignment rod 42 is penetrated through the elongated slot 50 of the bin, and the aligning rod 42 moves along the elongated slot 50 to abut the sheets S to the alignment reference plate 31. The lead cam 21 is provided with a helical groove 21*a* having a groove with a width slightly larger than the diameter of the roller 49. The roller 49 is engaged with the helical groove 21*a*. With the rotation of the lead cam 21, the roller 49 moves substantially vertically along the groove 21*a* (FIG. 1).

As shown in FIG. 5, the sorter 1 is equipped with a microcomputer 65 having an input port connected with a stapling button 61 and a sheet sensor 63 and an output connected with the LED element 62, various motors and solenoid or the like. Connected with the input and output port are a counter 66 for counting the number of sheets S accommodated in the bins, the copying machine 55 and the automatic document feeder 57, the counter 66 being controlled by a sensor SW1 disposed downstream of the pair of rollers 9.

Figure 6:
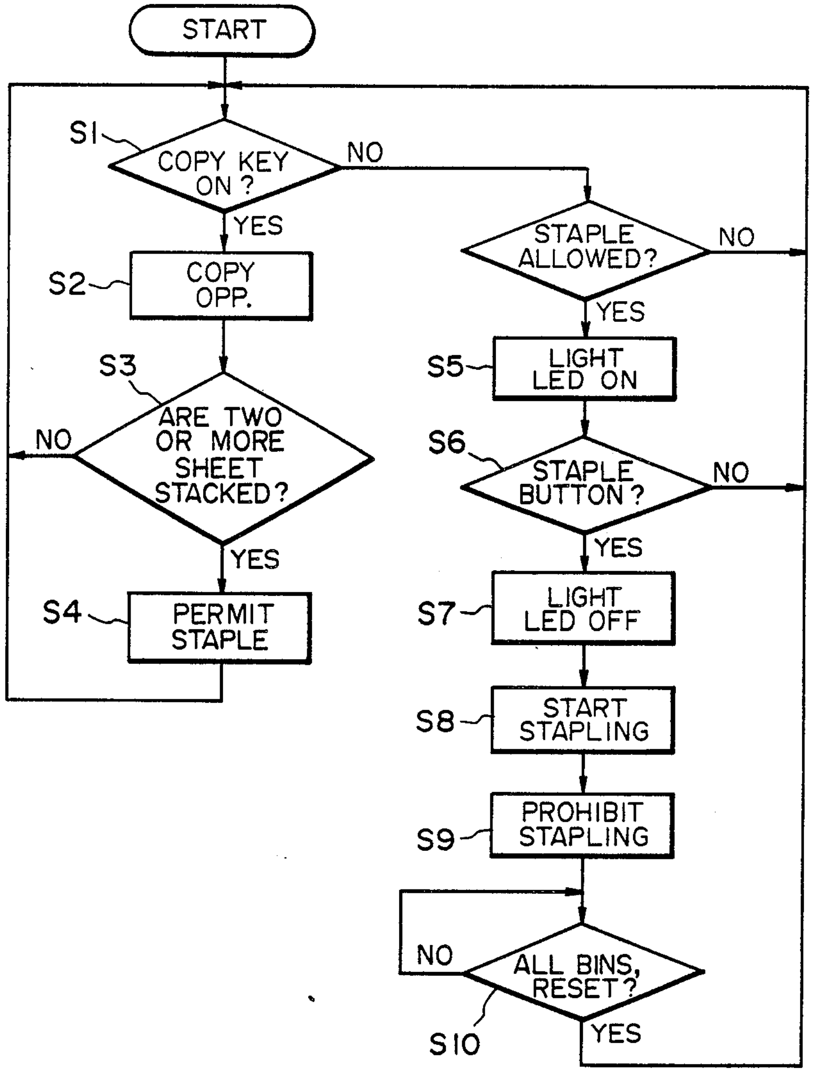
FIG. 6 is a flow chart illustrating the operation of the apparatus according to the present invention.

Referring to FIG. 6, the operation of the apparatus according to this embodiment will be described. When a plurality of sets of copies are to be produced from a book original, the operator places the book original on the platen 56 and sets in the input panel of the copying machine 55 the copy size and the number of copies or the like. When an unshown copy key is actuated (S1), the unshown copying station starts the copying operation (S2). The microcomputer 66 receiving the actuation signal of the copy key, rotates the lead cam 21 by the driving motor 17 until the topmost bin 10 reaches a position for receiving the sheets S discharged by the pair of discharging rollers 9 (FIG. 4). The sheets S discharged from the copying machine 55 after being subjected to the copying operation, is introduced into the main assembly 12 through the inlet 2 by the inlet pair of rollers 3, and it is conveyed to the flapper 7 by the pair of rollers 3. Then, the sheet S is guided to the conveyance passage 6 by the flapper 7 and is discharged to the topmost bin 10 of the bin unit 11 which is at the level lower than the discharging roller pair 9 through the passage 6. At this time, the sheet S is counted by the counter 66. The sheet S discharged onto the bin 10 is abutted to the rising portion 10*c* by the inclination of the bin 10. However, the sheet is away from the alignment reference plate 31. The microcomputer 65 having sheet size information from the copying machine 55 rotates the aligning rod 42 by the driving means from its home position H through a horizontal distance L, thus moving the sheet S from the chain line position to the solid line position to abuts and aligns the front edges of the sheet S relative to the alignment reference plate 31 (FIG. 3). A predetermined period thereafter, the driving means is reversed so that the alignment rod 42 is returned to the home position H. By repeating the operations, the bins are sequentially lifted step by step, and a predetermined number of sheets S are sorted and accommodated in the bins 10.

Subsequently, the operator exchanges the original to effect the second copying operation, and the second sheets S are sorted and accommodated in the respective bins 10. Then, the counter 66 transmits a signal indicative of each bin 10 containing two sheets S. The microcomputer 65 having received the signal from the counter 66 discriminates that each bin 10 now contains two sheets S (S3), in response to which it produces a staple permitting signal (S4), by which the LED element 62 is turned on. By this, the operator becomes aware that the stapling operation by the stapler 60 can be started by the stapling button 61 (S5). Looking at the lit LED 62, the operator makes a selection between binding or stapling the sheets S in the bins 10 and continuing the copying operation with the original exchanged.

When the continuing of the copying operation is selected, next original is copied on the sheets S similarly to the operations described above, and the sheets S are sorted and accommodated in the bins 10. When the number of sheets S accommodated in each of the bins exceeds the staplable number of the stapler 60 (25 sheets, for example), the microcomputer 65 terns off the LED element 62 to prohibit the start of the operation of the stapler 60 by the actuating the stapling button 61.

On the other hand, when the sheets S accommodated in the bins 10 are to be staple by the selection of the operator, the operator actuates the stapling button 61 (S6). The microcomputer 65 receiving actuation of the stapling button 61, terns off the LED element 62 (S7), and starts the stapling operation (S8). More particularly, the driving motor 17 rotates the lead cam 21 to move the topmost bin 10 to the stapling position, that is, the position for receiving the sheets S discharged through the pair of discharging rollers 9, in this embodiment. At this time, the stapler 60 moves to its operative position after completion of the bins, by which the sheets are sandwiched between the head and the anvil. The head lowers by operation of a motor or the like to press the sheets to the anvil to staple it. Thus, the sheets on the bin 10 is stapled by the stapler 60. Thereafter, the computer 65 rotates the lead cam 21 by the driving motor 17 to raise the bins 10 through an amount of one bin. The sheets S accommodated in the second bin 10 now shifted to the stapling position, are stapled by the stapler 60. By repeating the operations, the bins 10 are raised step by step, so that the sheets S on the bins 10 are sequentially stapled, until all the sheets S on the bins 10 are stapled. At this time, the copying apparatus 55 is prohibited from operating even if the copy key is actuated, and therefore, additional sheets S are prevented from erroneously introduced into the bins 10. Thus, erroneous stapling, sheet jam and other troubles are prevented. Upon completion of the stapling operation, the microcomputer 65 prohibits the start of the stapler 60 operation by the stapling button 61 (S9). When the operator takes all the sets of sheets S stapled out of the bin 10, the sheet sensor 63 is actuated. In response to this, the microcomputer 65 discriminates that no sheets is accommodated in any of the bins 10 (S10), and reset the counter 66 to be prepared for the next sorting and binding operations. Even if the sheet sensor 63 is not actuated, nonsorting mode operation is enabled.

When a plurality of sheet originals are to be copied, the operator actuates the copy key. Then, the automatic document feeder 57 separates one by one the originals M stacked on the original tray 59 from the bottom and conveys the separated sheet onto the platen 56 through the conveyance passage A. The copying station not shown of the copying machine 55 reads the original M, and after the reading, the original is conveyed through the discharging passage B and is discharged to the topmost of the original M on the original tray 59. Between the original not copied and the original having been copied, a partition lever (not shown) is inserted to prevent the mixture. The copying station having read the image of the original M copies the image on the sheet S which is fed from a sheet feeding station. The sheet S is subjected to an image fixing operation by a fixing device, and then, the sheet S is discharged from the copying machine 55.

The sheet S discharged from the copying machine 55 is conveyed into the main assembly 12 through the inlet 2 by the inlet rollers 3, and is conveyed to the flapper 7 by the rollers 3. Then, the sheet S is introduced into the passage 6 by the flapper 7 and is discharged onto the topmost bin 10 of the bin unit now moving to the position lower than the discharging rollers 9. At this time, the sheet S discharged into the bin 10 is abutted to the rising portion 10*c* by the inclination of the bin 10, but it is away from the alignment reference plate 31. The microcomputer 65 having received sheet size information from the copying machine 55 shifts the aligning rod 42 by the driving means from the home position H through a horizontal distance L to move the sheet S from the chain line position to the solid line position, so that the front side of the sheet S is abutted and aligned with respect to the alignment reference plate 31. A predetermined period after that, the driving means is reversed, so that the aligning rod 42 is returned to the home position H. The microcomputer 65, in response to a signal from an unshown sensor, discriminates whether or not an original is remaining on the original tray 59. If there is, the above operation is repeated to produce an image of the original M on the sheet S and to accommodate the sheets into the bin 10 and align it. Similarly, the above operation is repeated until no original M is remaining on the original tray 59. When the no original on the tray 59 is detected, the microcomputer 65 produces copy completion signal. At this time, when the number of sheets S accommodated in each of the bins 10 exceeds the staplable number of the sheets by the stapler 60, the microcomputer 65 receiving the signal from the counter 66 for counting the number of sheets S prohibits operation of the staler 60 and lights off the LED element 62.

On the other hand, if the number is within the staplable range, and the stapling instructions are already supplied, the computer 65 rotates the lead cam 21 by the driving motor 17 to move the topmost bin 10 to a stapling position, that is, the position where the sheets S discharged by the discharging rollers 9 are received. When the first sensor 62 detects this, the sheets S on the bin 10 are stapled by the stapler 60. The microcomputer 61 rotates the lead cam 21 by the driving motor 17 to raise the bin 10 by one step, and staples by the stapler 60 the sheets S accommodated in the second bin 10 now shifted to the stapling position. The bins 10 are stepwisely raised to staple the sheets on the subsequent bins 10, until all of the sheets S on the bins are stapled.

When the stapling instructions are not supplied beforehand, the stapling operation is performed by actuation of the stapling button 61 has in the case of the book original.

In the embodiment described above, when the stapling button 61 is depressed, the sheets S on all of the bins 10 are sequentially stapled by the stapler 60. However, this is not inevitable, and the sheets only in one bin 10 are stapled by one actuation of the stapling button 61. By doing so, a required number of sets of sheets only are stapled.

As for the means for counting the number of copies, illumination means for leading the original (a lamp L, for example) may be used. For example, when two copies are produced, the lamp L makes two reciprocating movements, and the number of reciprocations is counted. As an another alternative, a sensor may be disposed at the sheet outlet of the copying machine to control the counter.

When an automatic document feeder is used for supplying the originals, the number of originals may be taken as the number of copy sheets. As a further alternative, a switch for sensing passage of the originals is provided in each of the passages A and B to control the counter.

In this embodiment, any types of counting is, the counting of the sheets accommodated in the sheet accommodating means.

While the invention has been described with reference to the structures disclosed herein, it is not confined to the details set forth and this application is intended to cover such modifications or changes as may come within the purposes of the improvements or the scope of the following claims.

What is claimed is:

1. A sheet sorter with a binder, comprising:

a plurality of bins for accommodating sorted sheets discharged after images are formed thereon;

means for shifting said plurality of bins each time the sheet is received by a said bin;

binder means for binding the sheets stacked on said bins in a binding mode;

counting means for counting a number of sheets accommodated in said bins;

automatic control means for controlling shifting operation of said bins and binding operation of said binding means in response to a signal indicative of completion of sheet accommodating operation when the binding mode is selected;

manual control means for controlling the shifting operation of said bins and binding operation of said binding means; and control means for discriminating whether or not the number counted by said counting means is within a predetermined range, and for permitting operation of said binder means by actuation of said manual control means, when the number is within the predetermined range.

2. A sorter according to claim 1, wherein said counting means is provided with detecting means for detecting the sheets discharged to said sheet stacking means when they are discharged.

3. A sorter according to claim 1, wherein said manual means is a switch externally actuatable and is provided with a display lamp indicated that the binding operation is possible.

4. A sorter according to any one of claims 1, 2 or 3, wherein said binder means is a stapler.

5. An image forming apparatus, comprising:

image forming means;

a plurality of bins for accommodating sorted sheets discharged after images are formed thereon by said image forming means;

means for shifting said plurality of bins each time the sheet is received by a said bin;

binder means for binding the sheets stacked on said bins in a binding mode;

counting means for counting a number of sheets accommodated in said bins;

automatic control means for controlling shifting operation of said bins and binding operation of said binding means in response to a signal indicative of completion of sheet accommodating operation when the binding mode is selected;

manual control means for controlling the shifting operation of said bins and binding operation of said binding means; and control means for discriminating whether or not the number counted by said counting means is within a predetermined range, and for permitting operation of said binder means by actuation of said manual control means, when the number is within the predetermined range.

6. An apparatus according to claim 5, wherein said counting means is provided with detecting means for detecting the sheets discharged to said sheet stacking means when they are discharged.

7. An apparatus according to claim 5, wherein said counting means includes means for counting a number of image forming operations by said image forming means.

8. An apparatus according to claim 5, further comprising an automatic document feeder, and said counting means counts a number of originals fed by said document feeder.

* * * * *

UNITED STATES PATENT AND TRADEMARK OFFICE
CERTIFICATE OF CORRECTION

PATENT NO. : 4,965,629

DATED : October 23, 1990

INVENTOR(S) : Hiroi, et al.

It is certified that error appears in the above-identified patent and that said Letters Patent is hereby corrected as shown below:

FIG 6 (SHEET 6 OF 6)

Change "SHEET" to read --SHEETS--.

COLUMN 3

Line 17, change "41" to --41.--.

COLUMN 4

Line 37, change "to abuts and aligns" to --to abut and align--; and

Line 68, change "terns" to --turns--.

COLUMN 5

Line 4, change "staple" to --stapled--;

Line 7, change "terns" to --turns--; and

Line 29, change "from" to --from being--.

COLUMN 6

Line 37, change "wisely" to --wise--;

Line 55, delete "an"; and

Line 64, change "types" to --type--, and change "is," to --is--.

UNITED STATES PATENT AND TRADEMARK OFFICE

CERTIFICATE OF CORRECTION

PATENT NO. : 4,965,629

DATED : October 23, 1990

INVENTOR(S) : Hiroi, et al.

It is certified that error appears in the above-identified patent and that said Letters Patent is hereby corrected as shown below:

COLUMN 7

Line 35, change "indicated" to --indicating--.

Signed and Sealed this

Sixteenth Day of June, 1992

*Attest:*

DOUGLAS B. COMER

*Attesting Officer*

*Acting Commissioner of Patents and Trademarks*